United States Patent [19]

Cabrera

[11] Patent Number: 5,259,575
[45] Date of Patent: Nov. 9, 1993

[54] AIRPLANE STRETCHER SYSTEM

[76] Inventor: Carlos P. Cabrera, Calle Pio Baroja No. 5, Colonia De San Andres Colmenar Viejo, 25770 Madrid, Spain

[21] Appl. No.: 855,607

[22] Filed: Mar. 20, 1992

[51] Int. Cl.$^5$ .................. B64D 11/06; B61D 1/02
[52] U.S. Cl. .................. 244/118.5; 244/118.6; 244/118.2; 244/129.3; 105/316; 105/319
[58] Field of Search ............ 244/118.2, 118.5, 118.6, 244/129.3, 137.1; 105/314, 315, 316, 317, 319, 321, 322; 5/8, 118; 296/20

[56] References Cited

U.S. PATENT DOCUMENTS

| | | | |
|---|---|---|---|
| 544,980 | 8/1895 | Hoskins | 105/321 |
| 2,494,690 | 1/1950 | Cerny | 244/118.5 |
| 3,742,529 | 7/1973 | Stehlik | 5/118 |
| 3,898,704 | 8/1975 | Gallaher et al. | 244/118.6 |
| 4,115,884 | 9/1978 | Keogh | 244/118.6 |
| 4,138,949 | 2/1979 | Gutridge et al. | 105/314 |
| 4,197,600 | 4/1980 | Slabic | 5/118 |

FOREIGN PATENT DOCUMENTS

| | | | |
|---|---|---|---|
| 2313395 | 9/1974 | Fed. Rep. of Germany | 5/118 |
| 2630210 | 1/1978 | Fed. Rep. of Germany | 244/118.6 |
| 2576761 | 8/1986 | France | 244/118.6 |
| 8401599 | 12/1985 | Netherlands | 5/118 |
| 770875 | 10/1980 | U.S.S.R. | 5/118 |

*Primary Examiner*—Joseph F. Peters, Jr.
*Assistant Examiner*—Virna Lissi Ansley
*Attorney, Agent, or Firm*—Thomas A. O'Rourke

[57] ABSTRACT

A stretcher which is adapted to be hingedly attached to the inside surface of a transportation means is disclosed. The stretcher is provided with orifices through the top and bottom surfaces of the stretcher such that the location of the orifices corresponds to the arrangement of the windows in the transportation means so that the passenger's view is not blocked by the stretcher when the stretcher is not in use.

20 Claims, 7 Drawing Sheets

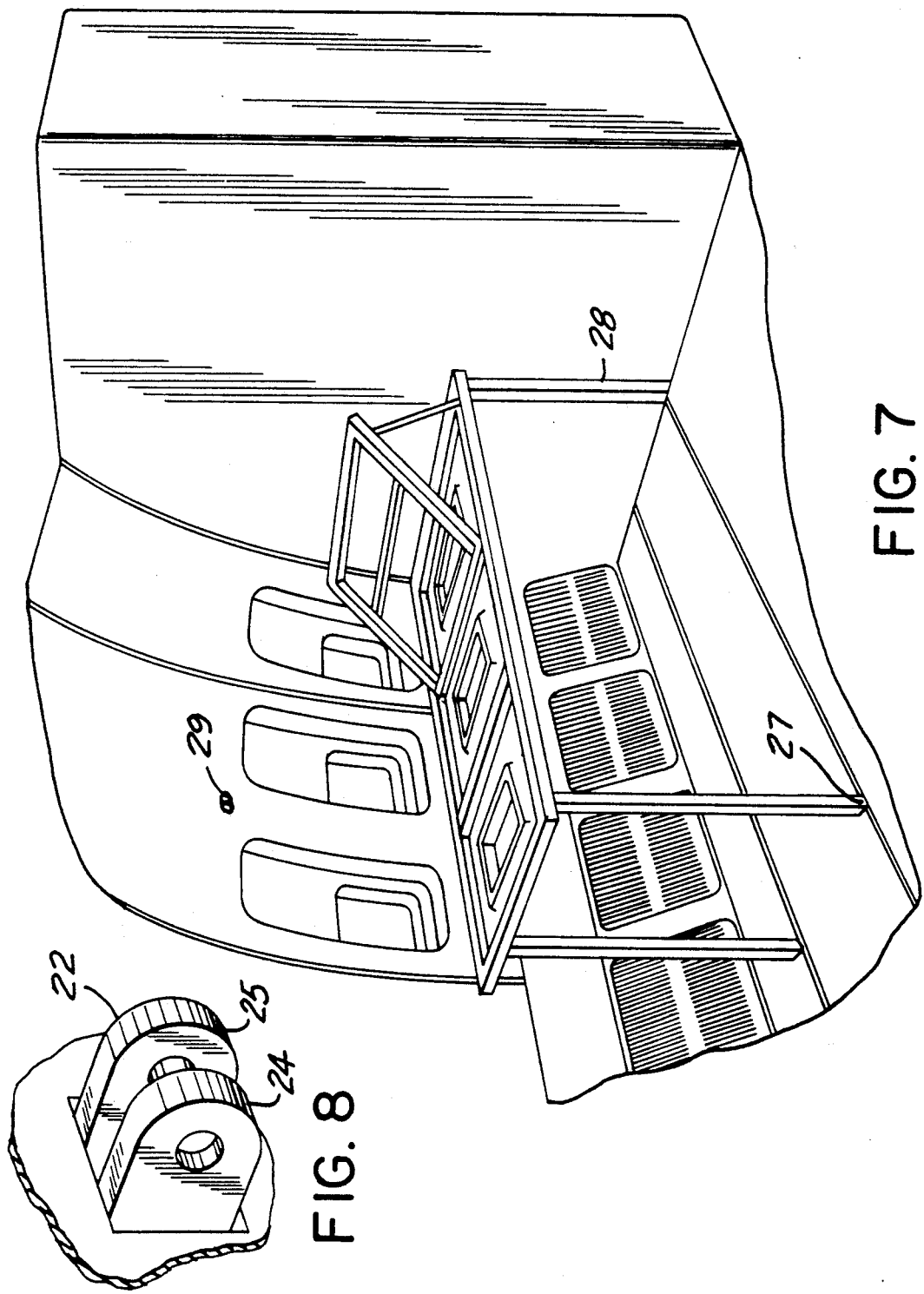

AIRPLANE STRETCHER SYSTEM

As commercial air travel has expanded in the last half century from its early beginnings, people are travelling further from home than ever before due to expanding business travel and to the availability of reasonably priced airfares. In addition, as leisure time has increased, people are able to go for longer vacations. Furthermore, as airplanes have become faster people have chosen to fly longer distances. Thus, while trips within the Untied States are the most common, more people than ever before have both the time and money to travel to more exotic locations around the globe.

In an ideal world medical problems would not exist or if they did would be confined to persons when they are close to home and their regular physician and hospital. Unfortunately this is not always the case. Frequently, a traveler may be injured on a trip or may suffer from a sudden illness or other medical problem that requires complex medical treatment. Not every country has modern facilities for treatment of illnesses and in other instances the patient may desire to return home for treatment by his personal physician. The airlines are also confronted, not infrequently, with instances where a traveller, perhaps under a doctor's care, suffers an unexpected relapse while travelling and is forced to lay down in a reclining position for a portion or all of the flight.

If the traveller can sit upright in an airline seat for the long trip illness does not necessarily present a great problem for the airlines or the patient. However, airline seats are not conducive to rest or patient comfort. In addition, there is very little room for the patient in a typical airline seat. Furthermore, there are many instances where the patent cannot travel in an upright position but is required to remain in a supine or prone position for the entire duration of the trip. In addition, it is not uncommon that passengers can suffer from heart attacks or other maladies in flight which require that the traveller be placed in a prone or supine position for the remainder of the flight.

While an ordinary stretcher may be used for transporting patients, traditional stretchers are not especially adapted for use and storage on airplanes. Stretchers also are particularly long and bulky. In view of the need for airlines to have as many seats available for passengers and for the passengers to have as much storage space available for their belongings, commercial airlines do not have large areas of vacant space to permit a stretcher to be conveniently stored. In addition, while medical emergencies are not infrequent on flights, they do not occur regularly or predictably on. As a result, airline executives have a dilemma that is difficult to resolve. Do they equip the plane with a stretcher for medical emergencies or do they hope that problems will not arise while in flight and, thus choose not to equip the plane with a means for transporting patients in a supine position.

Another factor in these considerations is that commercial stretchers are not designed for convenient airplane use and storage so that it is difficult to secure the stretcher to the cabin of the aircraft when needed so that the patient is secure and not further injured during the take off and landing of the airplane. In addition, airplane travel is not always velvety smooth. Most trips are punctuated with at least some turbulence and frequently, in stormy weather, there can be bouts of severe turbulence that could cause undesirable movement of the patient. Thus, properly and safely fastening the stretcher to the plane is also necessary to prevent injury during flight turbulence.

One approach to airplane stretcher systems is disclosed in U.S. Pat. No. 4,115,884 to Keogh. Disclosed in Keogh is a supporting structure for a removable stretcher which is adapted to be placed on an assembly which is anchored to the plane. The stretcher of Keogh is an ordinary stretcher with a tubular frame that has a fabric material in its center to provide cushioning to the patient. Straps are provided to hold the patient down during flight.

The Keogh stretcher is placed on a specially designed table which is provided with upwardly facing hooks that will receive the tubular stretcher frame and lock it into place. The table has two pairs of legs which are adapted to be anchored to the anchoring means on the floor of the plane which holds the seats in place. The table is further secured by straps which also convert the table to the seat anchoring system of the airplane.

One of the problems not addressed by Keogh is the storage of the stretcher support when not in use. Keogh is not concerned with this problem at all and in fact Keogh appears to contemplate that the stretcher support would be removed from the airplane and not stored thereon.

In addition to the need for a stretcher in commercial airplanes, stretchers also have application in military air transports where there is a critical necessity for the wounded and the injured to be taken to a medical facility as promptly as possible. This requirement is not recognized by the Keogh patent.

SUMMARY OF THE INVENTION

The present invention is directed to an improved stretcher system particularly adapted for use in commercial airlines but also useful in other modes or means of commercial transportation such as trains and buses. The present invention is also suitable for use in helicopter and military transport.

The present invention is directed to a stretcher system that provides the patient with the proper support and restraint yet also provides a system that can be unobtrusively be stored in the confines of a commercial airline train or bus. Specifically, the present invention is directed to a stretcher system that is stored in an unopened position along the exterior wall of the airplane. The stretcher is designed so it is retained on the interior wall of the airplane so that the stretcher may be pulled down from its storage position as needed. This is accomplished by having one side of the stretcher hingedly connected to the wall of the airplane. The stretcher is, importantly, designed and shaped so that its stored position conforms to the inside wall of the plane and does not create undesirable seating when it is in a stored or unused position.

One feature of the present invention is to provide a stored stretcher that does not interfere with the comfort and convenience of other passengers when not in use. This is accomplished by the provision of cutout portions in the shape of the windows so that when the stretcher is in its stored position, the passenger can still see out the airplane. At the same time this configuration avoids a claustriphobic feeling that could cause passengers to complain about the seat thus creating unnecessary problems for the flight attendants in arranging seating. As many people are aware, certain seats in airlines are better or worse than others and the existence of these seats can cause a great deal of unnecessary commotion for the flight attendants. For example, some people avoid bulkhead seats while others particularly those travelling with small children prefer them. Others avoid the exit rows because of the added responsibilities in an emergency. The cutout portions in the stretcher help eliminate passenger complaints about the quality of the seats by the stretcher.

The present invention is also designed so that the feet or legs necessary to support the stretcher system can be stored conveniently within the stretcher and therefore be hidden from view yet readily accessible when the stretcher is to be placed in use.

The stretcher of the present invention may also be in the form of one or more retractable sections that can be stored within a portion of a main or primary section so that the stretcher takes up only small amounts of space when stored. This embodiment is particularly suitable for use in helicoptors.

OBJECT OF THE INVENTION

It is an object of the present invention to provide a low cost stretcher system that may be conveniently and unabrusively stored on commercial transportation such as airlines, trains and buses and on military type air transports.

It is an object of the present invention to provide a stretcher in system that is easy to use and set up by flight attendants and other personnel without requiring a significant pre-assembly training.

It is also an object of the present invention to provide a stretcher which will provide the injured passenger with a safe and secure mode of transportation.

It is a further object of the present invention to provide a lightweight and safe stretcher system that protects the patient from discomfort or further injury.

These and other objects of the present invention can be seen from the detailed description of the invention of which the following is a

BRIEF DESCRIPTION OF THE DRAWINGS

FIG. 7 shows the embodiment of FIG. 6 in an installed position.

FIG. 8 shows a hinge means of the present invention.

DETAILED DESCRIPTION OF THE INVENTION

Figure 1:
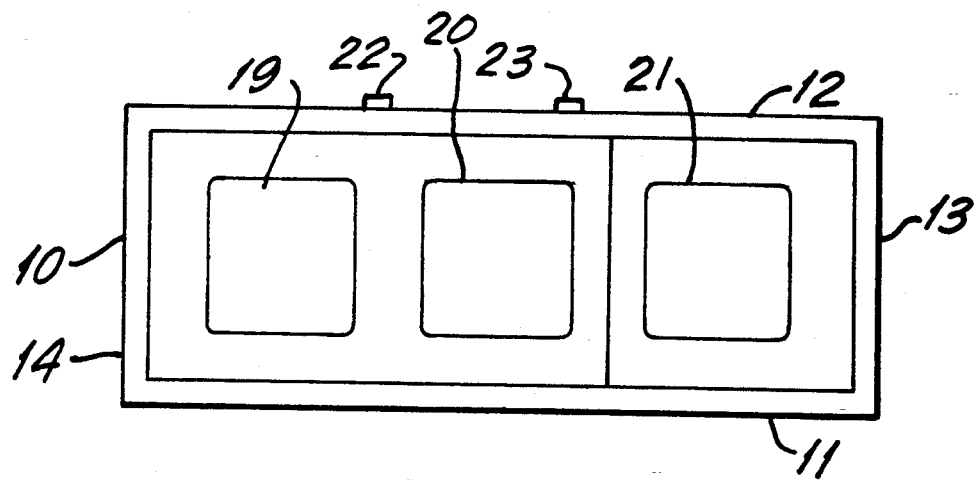
FIG. 1 shows top view of the stretcher of the present invention.
Figure 2:
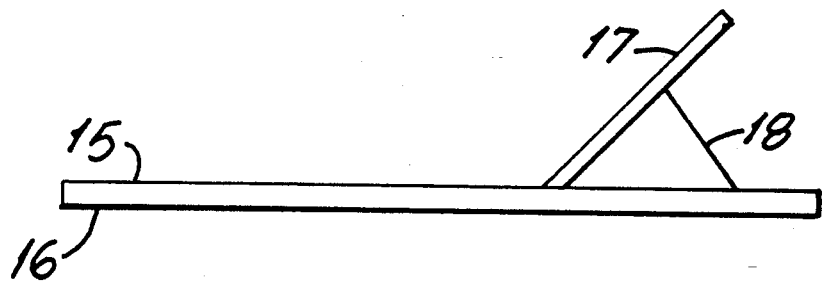
FIG. 2 shows a side view of the stretcher of the present invention.
Figure 3:
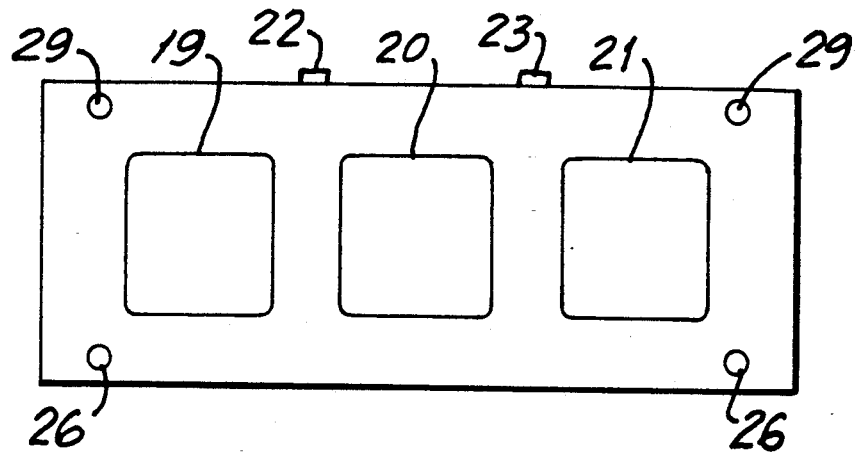
FIG. 3 shows a bottom view of the stretcher of the present invention.

FIG. 1 shows the stretcher 10 of the present invention having a pair of generally parallel sides, 11, 12 with a top or head portion 13 and a base or feet portion 14. While the stretcher is shown with sharp corners in the figure the areas where the sides and top and bottom portions meet the corners are preferably rounded. The stretcher is provided with an upper surface 15 and a lower surface 16 which are joined by sidewalls and is generally hollow inside. The invention is preferably made of a strong lightweight metal such as aluminum. One preferred material is Duraluminum alloy. However, it is possible that certain portions of the stretcher may be made of plastic or other materials that have the requisite strength and resistance to heat or flame. For example when the stretcher is intended to be used on a bus or train and the threat of fire is not as great as in a plane, the stretcher or components thereof may be made of, for example, fiber glas or other suitable plastic material. In addition, a plastic coating may be present over the metal frame.

Headrest 17 is stored in a recess in the stretcher and it may be raised to any desired height. Headrest 17 is held in a raised position by support 18. The surface of the stretcher may be provided with orifices 19, 20 and 21 which extend completely through the upper and lower surfaces 15 and 16. These orifices are designed to be located where the windows are located so that the passengers can still see out of the vehicle.

On one side of the stretcher i.e. the side adjacent the inside wall of the fuselage there is provided hinge means 22, 23. Preferably there are a pair of hinge means, 22, 23, one toward each end of the stretcher to provide stability. FIG. 8 shows one example of a hinge means which can be used in the present invention. The hinge means 22 is comprised of a pair of holed members 24 and 25. A corresponding but offset pair of members may be on the stretcher. Alternatively there may just be a single member on the stretcher that fits between members 24 and 25. A pin, not shown, passes through each of the orifices in members 24 and 25 and through the orifices on the portion on the stretcher to hold the stretcher to the hinge means. Preferably, the pin on the hinge means is removable to permit the stretcher to be removed from the plane. One skilled in the art will recognize that various alternative hinge means can also be used.

The plane can be provided with a tracked portion in the fuselage in which the hinge means 22 is located. This tracking means would permit the hinge to be raised and/or lowered to any suitable position. The tracking means would be provided with a suitable locking means to prevent undesirable movement of the hinge means. One means would be to have spring loaded pins which pass through holes in the track to lock the hinge means in place. To move the hinge means, the pins are pushed in and the hinge means can be raised or lowered.

On the underside of the stretcher there are provided a means 26 for attaching legs 27, 28. The means for attaching legs may be for example a female threaded member to permit the legs to be screwed into place. Alternatively, a bayonet type attachment means can be used whereby a button on the legs is pressed to release the legs from the bayonet attachment means. When the attachment means is a threaded female member, the legs are provided with a correspondingly threaded male member. It will be appreciated by those skilled in the art that the attachment means for the legs may be of any suitable type. One alternative means is by the use of, for example, folding legs which may be releasably locked to a raised position for supporting the stretcher and foldable down into a stored position. Preferably the legs would fold down into a recess provided in the underside of the stretcher. Also the legs could also be telescoping to reduce the amount of space taken up by the legs when stored. The legs may also be provided with retractable wheels that permit the stretcher to be wheeled off the plane.

In order to reduce the space necessary for the stretcher as much as possible the legs are storable in the center portion of the stretcher between the top and bottom surfaces. The legs may be inserted in an opening at one of the ends of the stretcher for storage purposes. In another embodiment the legs may be stored in a recess designed into the underside of the stretcher.

The stretcher is also provided with a locking means which holds the stretcher in the stored position when the stretcher is not in use. The lock means could be similar to the hinge and pin shown in FIG. 8 or some alternative locking means can be raised. When unlocked the stretcher folds down along the hinge means and rests on the legs. The legs can be attached to the floor of the plane by any suitable means but it is preferred that the legs be held by anchoring them to the channels for holding the seats in place in order to prevent turbulence in the aircraft from causing the stretcher to bounce. Alternatively, the legs can be fastened to the seats.

It is also preferred that the hinge means permit the stretcher to be released so that the patient can be carried on and off the plane while on the stretcher. It is also preferred that additional leg attachment means 29 be provided on the hinge means side of the stretcher so that another pair of legs can be attached so that the stretcher will be free standing when it is removed from the airplane. This can be seen for example in FIG. 7.

The stretcher is also provided with an IV pole which may be stored inside the stretcher as are the legs. The IV pole can be screwed into a hole in the upper surface of the stretcher or attached to the side of the stretcher. This pole is preferably telescopic to reduce the amount of room needed during storage. Alternatively the IV bottle may be suspended by a hook or other means from the ceiling of the plane. The stretcher may also be adapted to have a railing around at least one side of the stretcher. This railing may be stored in the interior of the stretcher.

The plane may also be provided with a means to place a curtain around the patient such as by hanging the curtain from the ceiling of the plane. The curtain can be attached to the stretcher by a suitable means such as by snap buttons.

Orifices 19, 20 and 21 may be closed by retractable or removable panels which close the orifices when the stretcher is going to be used but can be opened when the stretcher is stored to permit passengers to look out of the windows. The removable panels may also be stored within the stretcher. When retractable panels are used they can be slidably retained on a track within the stretcher.

For aesthetics and increased comfort to the passengers seated next to the stretcher, the outer surface of the stretcher can be covered with fabric to match the interior of the plane. This outer covering may be either removable or covered with a plastic covering to protect the fabric when the stretcher is in use by a patient. In a preferred embodiment the fabric of the plane remains on the underside of the stretcher when in use.

Figure 4:
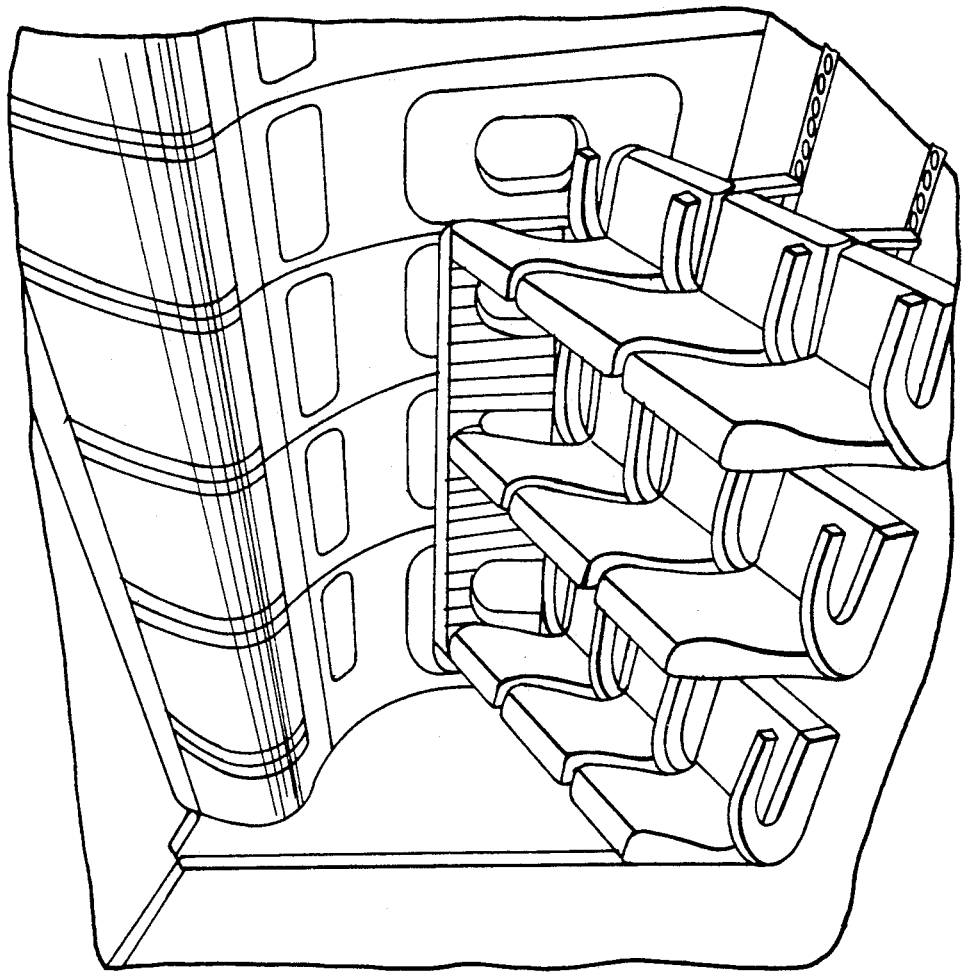
FIG. 4 shows the stretcher of the present invention installed in an airplane in a stored position.

FIG. 4 shows the stretcher of the present invention in a stored position. When the stretcher must be put in use the backs of the adjacent seats are removed. The lock is released and the stretcher folds down. The legs may be installed either before folding the stretcher down or while the stretcher is horizontal, depending on the amount of room present to maneuver the legs.

Figure 5:
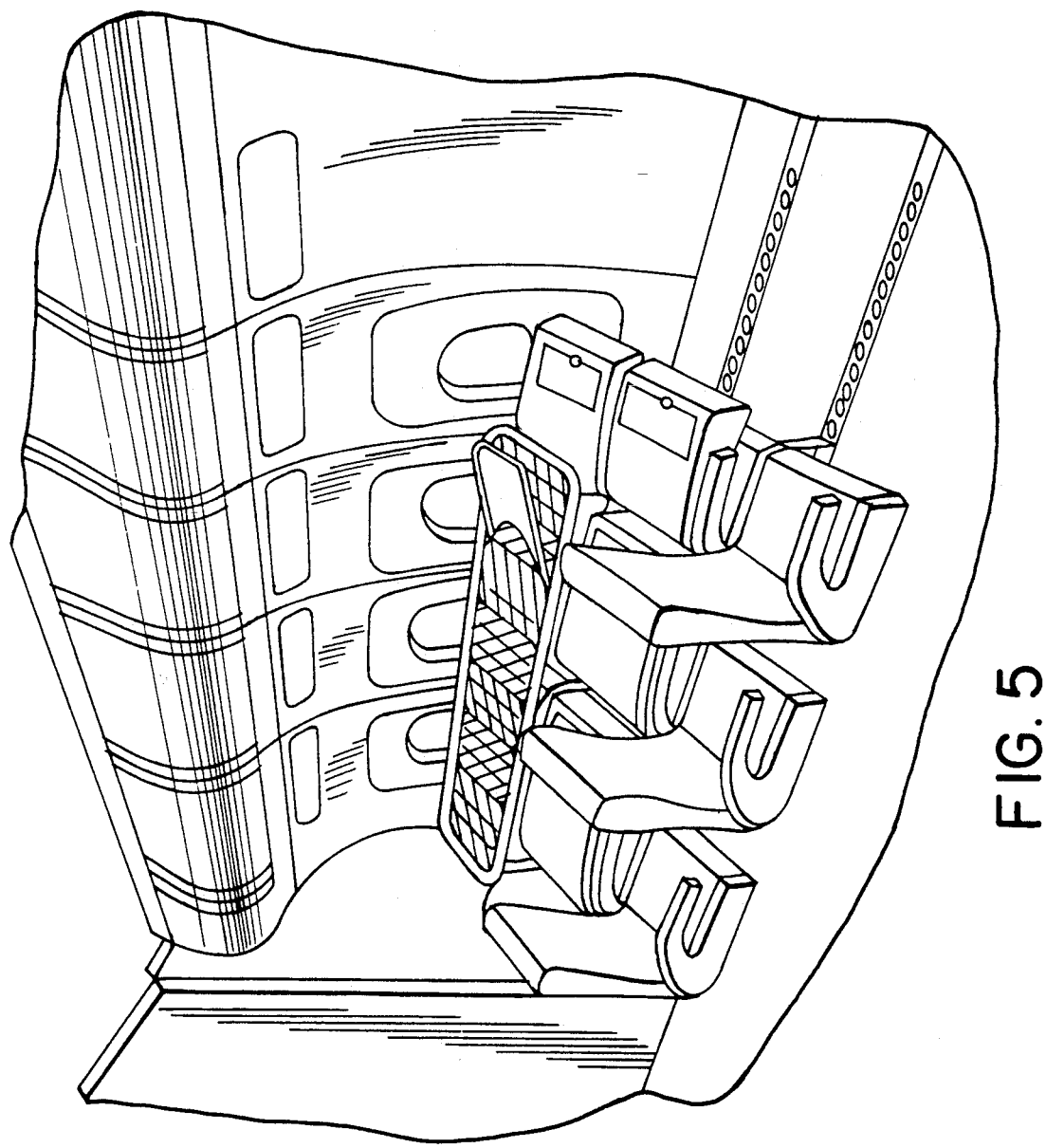
FIG. 5 shows the stretcher of the present invention as installed in an airplane.
Figure 10:
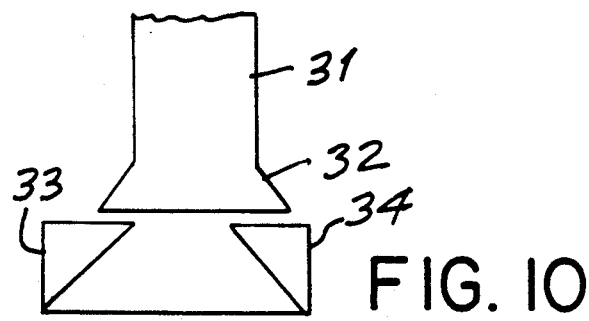
FIG. 10 shows a means for securing the legs of the stretchers of the present invention to the floor of the plane.

FIG. 5 shows the stretcher of the present invention with the seat backs removed. The legs are attached to the runners on the floor of the plane which runners anchor the seats to the plane. This is depicted in FIG. 10 where there is a leg 31 having a base portion 32. The runner or track in the floor periodically has an orifice large enough to receive base portion 32. When the base portion is inserted in the orifice in the runner or the floor, the leg is then moved away from the orifice and prevented from being removed by protruding members 33 and 34. When the stretcher is removed from the plane the base of the leg is pushed toward the orifice to permit removal therefrom. The stretcher is also shown in FIG. 7 with additional legs along the side of the plane. This provides additional stability for the stretcher during flight. Also the stretcher will be free standing when the stretcher is removed from the airplane.

The stretcher is also preferably provided with a restraining means such as seat belt type straps which go across the chest, the waist and legs of the patient. In an alternative embodiment the restraining means may be a three point system where a strap goes across the waist and another over the shoulder from the waist. In still another embodiment a parachute type harness can be used to hold the patient's torso can be held in place.

If desired, the stretcher may be attached also the bulkhead of the planes interior either alone or in conjunction with the hinged means on the side of the plane. If the stretcher is attached to the bulkhead alone and is not provided with a hinged means along side of the plane, the base or top portion of the stretcher may be hingedly fastened to the bulkhead and the stretcher designed to fold up into the bulkhead. Because of the height of the stretcher it is preferred that the stretcher be attached to the bulkhead by a means such as a pair of tracks so that the portion attached to the bulkhead can either be raised toward the ceiling or lowered toward the floor so that the stretcher is stored in the bulkhead can be folded up. One such means of having the stretcher attached to the bulkhead is by having the stretcher provided with a pair of pins on each side of the end to be attached to the bulkhead. These pins are provided with, for example, rollers which are retained in a pair of runners or tracks in a recess in the bulkhead. The rollers permit the stretcher to be raised or lowered so that it will slip into a recess provided in the bulkhead. Provision can be made for a lock means to retain the stretcher in position until needed. Preferably, the pins and the rollers are removable to permit the stretcher to be removed from the plane as necessary.

Figure 6:
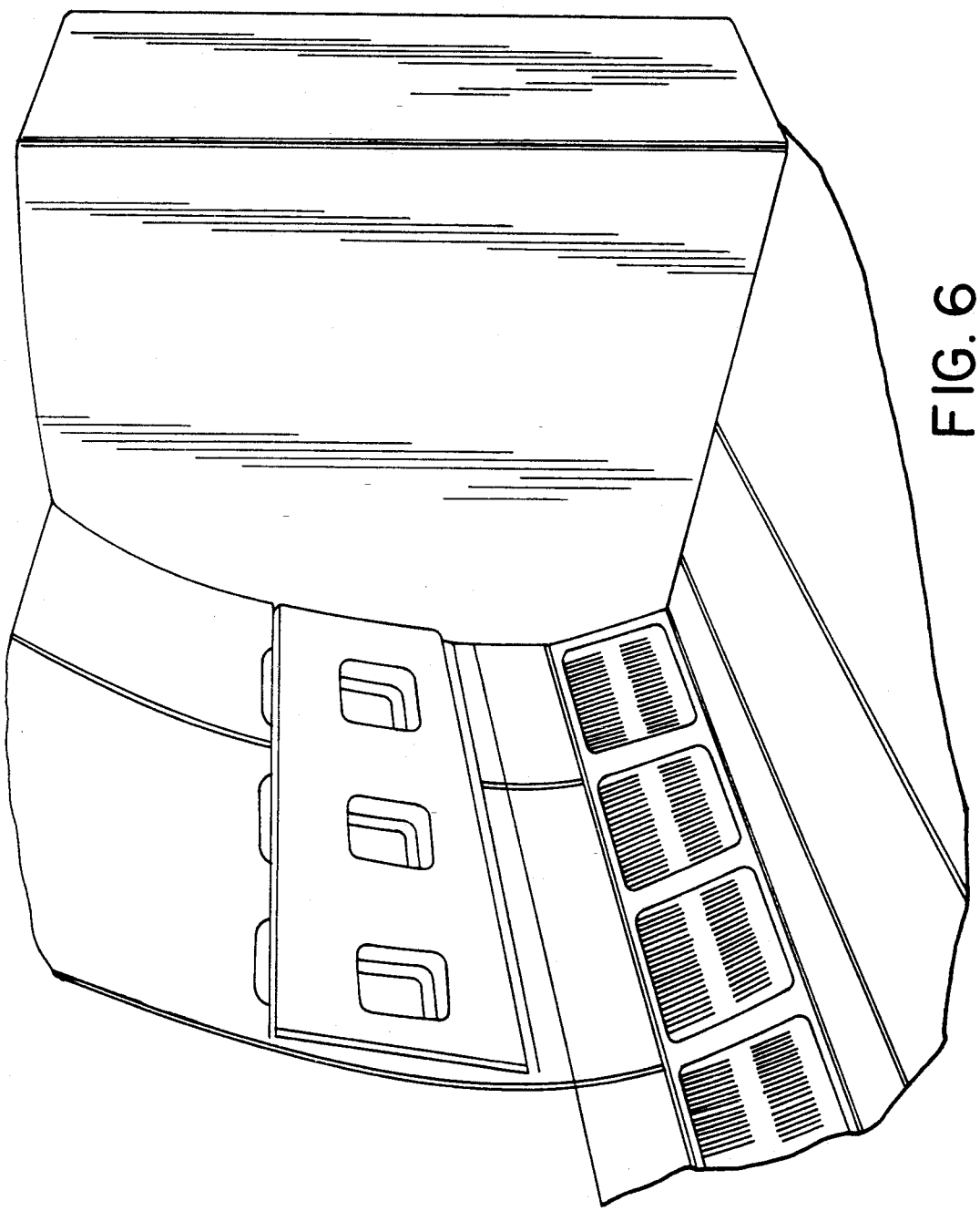
FIG. 6 shows an alternate embodiment of the invention wherein the stretcher is stored near a bulkhead of the airplane.
Figure 9:
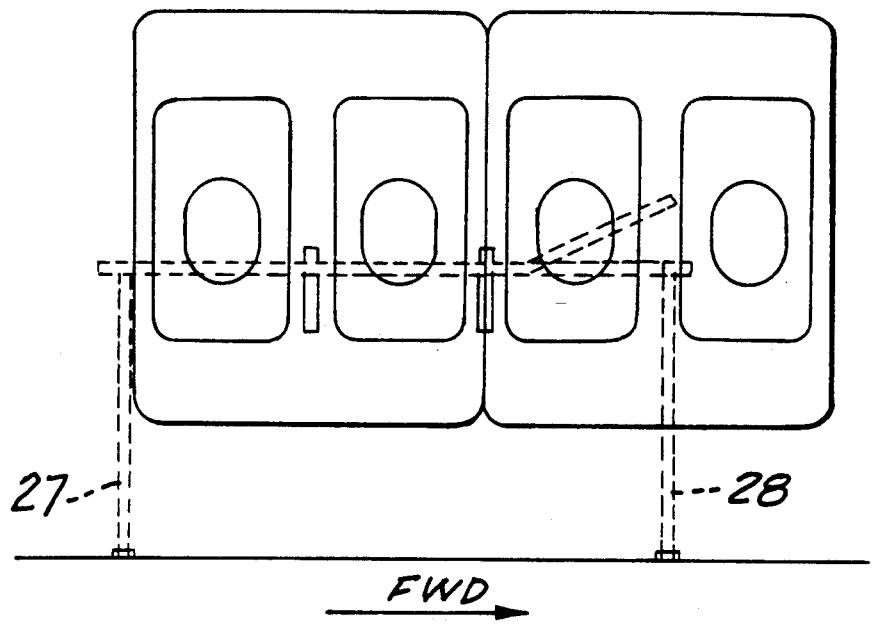
FIG. 9 is a side view of the stretcher of the present invention in an installed position.
Figure 9A:
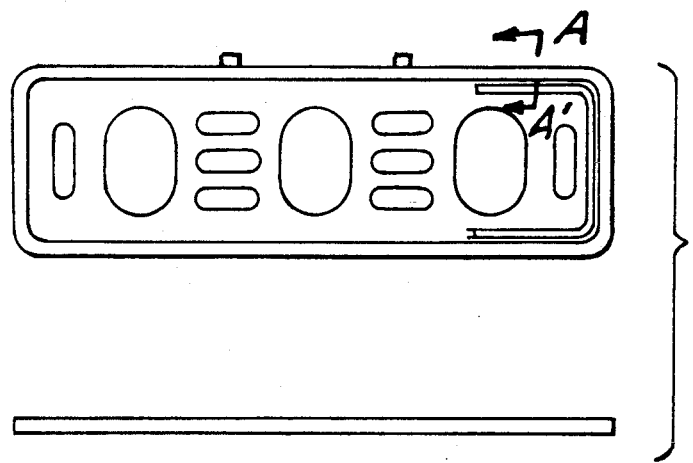
FIG. 9A is a top view of the stretcher of FIG. 9.

FIG. 6 shows the stretcher of the present invention in a stored position with the adjacent seats not shown. The stretch is shown in proximity to the bulkhead but it is not attached thereto. FIG. 7 shows a stretcher of FIG. 6 in a lowered position.

The features of the present invention are not limited to commercial aircraft but also have application in military aircraft including helicopters. In most military transport type planes the interior of the plane does not have the "plush" interior of commercial airplanes. On the contrary, the interior is interior is frequently characterized by merely the frame of the plane and the inside surface of the outer skin of the plane. The frame of the plane usually is provided with a series of generally parallel ribs which extend from the floor of the plane to the ceiling where they meet and are joined to ribs from the opposite side of the plane.

It has been found that there is a need for storing stretchers in a military transport plane so that they take up a minimum of space that would be required for men and materials yet the stretchers must be immediately accessable.

Figure 12:
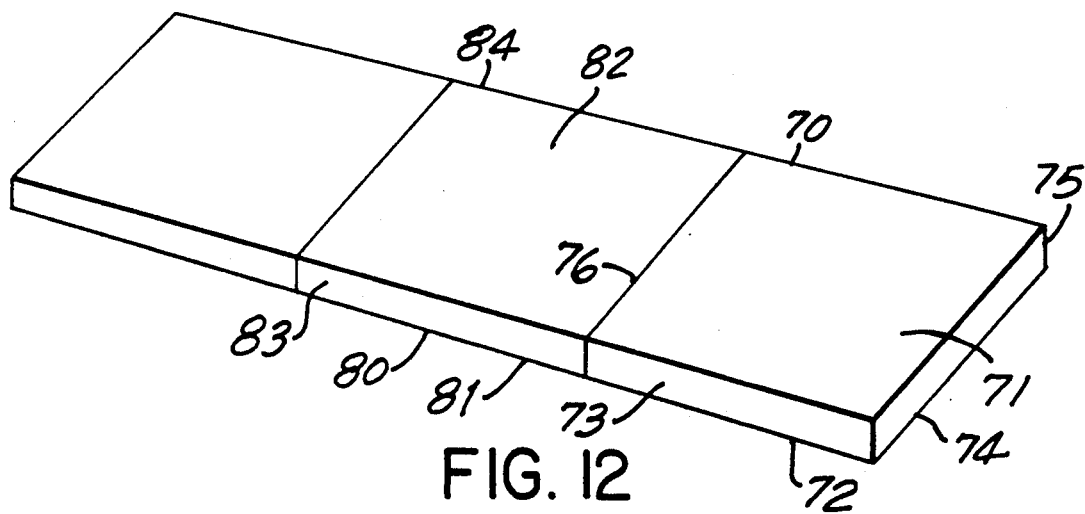
FIG. 12 shows an embodiment of the present invention for use on helicopters or where space is limited.

One of the features of modern combat is the need and the desire for prompt treatment of the wounded or injured. However, there are many instances where the wounded and/or injured need more extensive treatment than is available close to the combat area. As a result, prompt transporting of the wounded to complete medial facilities is critical. The initial movement from a gathering point near the combat zone can be accomplished by helicopter. While helicopters do not have a great deal of room for stretchers, in one embodiment of the present invention, the stretcher is provided in two or more sections which retract into each other to reduce the space needed for the stretcher when not in use. As shown in FIG. 12 there is provided a stretcher 81 having a first section 82 which is of sufficient thickness to permit a second section to be stored therein. Second section is preferably slidable on either track or some other conventional means and when in a exposed position is retained in connection with the first member so they do not separate and provided with a locking means that the second section does not move out of position. Depending on the space requirements the stretcher can be provided with a third section which is similar in design to the second section and is slidable within the second section.

Stretchers of the type shown in FIG. 12 can also be provided with a hinge means on one side at either end so that the wounded can be taken from the helicopter while on the stretcher and transported to a hospital directly or taken directly to an airplane for further transport.

As shown in FIG. 12, the first section 70 is generally rectangular in shape although not required to be and has an upper surface 71 and a lower surface 72. The upper and lower surfaces are separated from each other by side walls 73, 74 and 75 around three sides of the first section 70. The remaining side of the first section 76 is preferably open to receive a second section. The second section 80 also has upper and lower surfaces 81 and 82 which are separated by side walls 83 and 84 around at least three sides. The thickness of the side walls of the second section is less than the thickness of the side walls of the first section so that the first section can receive the second section. If there is sufficient room on the plane or helicopter for the stretcher two sections may be sufficient. However, there may be instances where it is preferable that the stored stretcher take up even less room yet still have a similar length when opened. In those circumstances there will be a third or even more sections each similar to the second section but having thinner side walls than the preceding section to permit storage in the proceeding section. These sections should be should be capable of easy extensions to form a stretcher quickly. One approach would be to provide a track means for the sections to be slidable on. In addition, the section should be capable of being locked in an extended position when the stretcher is to be used.

The stretcher of FIG. 12 can also be provided with a means for attaching legs so the stretcher can be free standing. The legs of the present invention may also be provided with retractable wheels so that the stretcher may be rolled when necessary.

Figure 11:
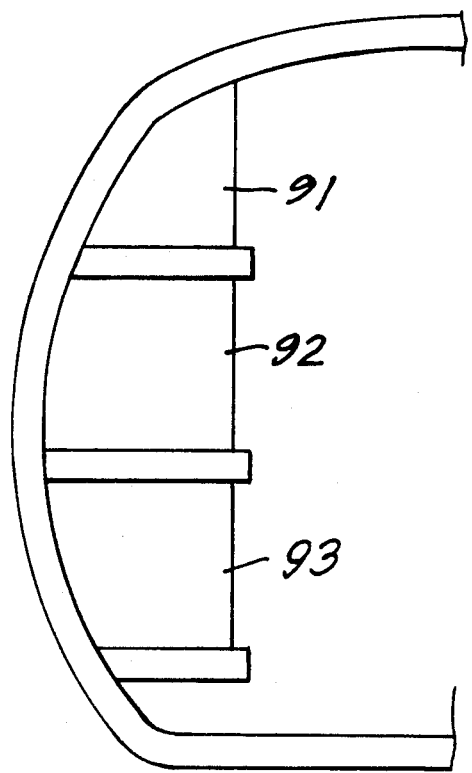
FIG. 11 shows an embodiment of the stretcher of the present invention for military air transports.

When used on military transports the ribs of the frame may be provided with hinge means similar to that shown in FIG. 11. The stretchers may be set up in a tiered arrangement whereby a plurality of stretchers may be present, one above the other. Each of these stretchers may fold up to a rest position and be held in place by a suitable means until deployment is necessary.

This is shown in FIG. 11 which depicts three stretchers of the present invention folded up for storage. FIG. 13 shows the stretcher when they have been deployed. Support member 91 can be provided on each end of the stretcher to provide additional support. Support member 91 can be for example a rod or wire adapted to be retained in the ceiling portion of thes plane. The rod or wire can be stored in the stretcher when not in use and, wire can be in the form of a spool which can wind up the wire. Support members 92 and 93 can be similar to support member 91 or in the alternative can be the legs described above. These legs can be locked into place to prevent the stretcher from moving during the flight or the landing and take off.

I claim:

1. A retractable stretcher for easy storage comprising a first section which is generally rectangular in shape, said first section having an upper surface and a lower surface, said upper and lower surfaces being separated by side walls so that said first section has a cavity therein and is open on at least one side, a second section generally rectangular in shape said second section having an upper surface and a lower surface, said upper and lower surfaces being separated by side walls, said side walls of said second section having a height less than the height of the side walls of said first second such that said second section may be stored within said first section said stretcher being capable of being removably attached to the inside surface of a means for transportation by a hinge means said first and second sections having an orifice through said top and bottom surfaces which orifices correspond to the arrangement of windows in a transportation means.

2. The stretcher according to claim 1 wherein said hinge means is connected to a tracking means which permits the hinge to be raised or lowered.

3. The stretcher according to claim 2 wherein said tracking means further comprising a locking means to prevent movement of said hinge means.

4. The stretcher according to claim 3 wherein said locking means is a spring loaded pin which passes through a hole in said track to lock said hinge means in place.

5. A retractable stretcher according to claim 1 wherein said second section is slideably retained in said first section along a track means and said second section may be locked in an open position.

6. A retractable stretcher according to claim 5 where there is a third section which is generally rectangular in shape having an upper surface and a lower surface said upper and lower surfaces being separated by sidewalls said sidewalls having a height which is less than the height of the sidewalls of said second section such that said third section may be stored within said second section.

7. The stretcher according to claim 6 wherein said stretcher is adapted to receive at least one pair of legs on the lower surfaces of said stretcher.

8. The stretcher according to claim 7 wherein said legs are adapted to being fastened to seats in said transportation means.

9. The stretcher of claim 7 wherein said legs are adapted to being anchored to channels in the floor of said transportation means.

10. A removable stretcher comprising an upper surface and a lower surface, said stretcher having side walls connecting said upper and lower surfaces so that a hollow portion is formed between said upper and lower surfaces, said hollow portion providing an area for storing legs when not in use, said legs being adapted to being removably connected to said lower surface along at least one side of the stretcher, the other side of said stretcher being capable of being removably attached to the inside surface of a means of transportation by a hinge means, said stretcher further comprising orifices through said top and bottom surfaces at a location in said stretcher to correspond to the arrangement of the windows in said transportation means such that said windows are not blocked by said stretcher when said stretcher is in a stored position along the inside surface of said transportation means, said orifices being adapted to receive panels which close said orifices, said panels capable of being retained within said stretcher when not in use.

11. The stretcher according to claim 10 wherein said legs are adapted to being fastened to seats in said transportation means.

12. The stretcher according to claim 10 wherein said hinge means is connected to a tracking means which permits the hinge means to be raised or lowered.

13. The stretcher according to claim 12 wherein said tracking means further comprises a locking means to prevent movement of said hinge means.

14. The stretcher according to claim 13 wherein said locking means is a spring looded pin which passes through a hole in said track to lock said hinge means in place.

15. The stretcher according to claim 14 wherein said hinge means comprises at least one holed member on the inside surface of said transportation means and at least one corresponding but offset holed member on said stretcher and wherein said holed members are joined by a removable pin.

16. The stretcher according to claim 12 wherein said stretcher is attached to said transportation means by a pair of tracks.

17. The stretcher of claim 10 wherein the upper surface is provided with a recess for a headrest said headrest being capable of being raised and lowered into a number of positions and wherein said headrest when lowered does not protrude above the upper surface of said stretcher.

18. The stretcher of claim 17 wherein said legs are adapted to being anchored to channels provided in the floor of said transportation means.

19. The stretcher according to claim 18 wherein said legs have a base portion having at least one protruding member such that when said base portion is inserted into a runner in the floor of said transportation means said protruding member retains said leg in engagement with said runner.

20. The stretcher according to claim 10 wherein said panels are retractable along a track in said stretcher.

* * * * *